United States Patent
Kinoshita et al.

(10) Patent No.: US 12,399,013 B2
(45) Date of Patent: Aug. 26, 2025

(54) POWER GENERATION PLANNING DEVICE AND POWER GENERATION PLANNING METHOD

(71) Applicant: HITACHI, LTD., Tokyo (JP)

(72) Inventors: Yoshihito Kinoshita, Tokyo (JP); Kota Imai, Tokyo (JP); Tatsuya Maeda, Tokyo (JP)

(73) Assignee: HITACHI, LTD., Tokyo (JP)

( * ) Notice: Subject to any disclaimer, the term of this patent is extended or adjusted under 35 U.S.C. 154(b) by 305 days.

(21) Appl. No.: 18/023,936

(22) PCT Filed: Aug. 20, 2021

(86) PCT No.: PCT/JP2021/030647
§ 371 (c)(1),
(2) Date: Feb. 28, 2023

(87) PCT Pub. No.: WO2022/102199
PCT Pub. Date: May 19, 2022

(65) Prior Publication Data
US 2023/0324181 A1    Oct. 12, 2023

(30) Foreign Application Priority Data

Nov. 13, 2020   (JP) .................. 2020-189596

(51) Int. Cl.
*G01C 21/20* (2006.01)
*B63B 49/00* (2006.01)
(Continued)

(52) U.S. Cl.
CPC ............ *G01C 21/203* (2013.01); *B63B 49/00* (2013.01); *B63B 79/20* (2020.01); *B63B 79/30* (2020.01);
(Continued)

(58) Field of Classification Search
None
See application file for complete search history.

(56) References Cited

U.S. PATENT DOCUMENTS 11,756,428 B2 *  9/2023  Ranjan ................... G06Q 10/08
                                                           701/410
11,829,935 B2 * 11/2023  Dulebenets ........ G06Q 10/1091
(Continued)

FOREIGN PATENT DOCUMENTS

| JP | 2018063546 A | 4/2018 |
| JP | 6513039 B2 | 5/2019 |
| JP | 6661501 B2 * | 3/2020 |

OTHER PUBLICATIONS

Toshiyuki Sawa, et al. "Daily Integrated Generation Scheduling for Thermal, Pumped-Storage Hydro and Cascaded Hydro Units and Purchasing Power Considering Network Constraints", The Institute of Electrical Engineers of Japan, vol. 128, No. 10, 2008, pp. 1227-1234.
(Continued)

*Primary Examiner* — Todd Melton
(74) *Attorney, Agent, or Firm* — Mattingly & Malur, PC

(57) ABSTRACT

This power generation planning device, which carries out plan creation or plan adjustment for a power generation plan for a generator and a ship allocation plan for a transport ship for power generation fuel for the generator, is provided with: an adjustment range calculation unit that calculates an adjustable range and adjustment cost for generator management based on a power generation plan, and an adjustable range and adjustment cost for fuel management based on a ship allocation plan; and an imbalance countermeasure amount calculation unit that, under a constraint condition pertaining to the power generation plan and the ship allocation plan, creates a plan or calculates an adjustment amount for generator management and fuel management
(Continued)

that optimizes a prescribed indicator within the adjustable ranges of the generator management and the fuel management.

10 Claims, 8 Drawing Sheets

(51) Int. Cl.
| | |
|---|---|
| *B63B 79/20* | (2020.01) |
| *B63B 79/30* | (2020.01) |
| *B63B 79/40* | (2020.01) |
| *G06Q 10/047* | (2023.01) |
| *G06Q 10/0631* | (2023.01) |
| *G06Q 10/083* | (2024.01) |
| *G06Q 50/06* | (2024.01) |

(52) U.S. Cl.
CPC ........... *B63B 79/40* (2020.01); *G06Q 10/047* (2013.01); *G06Q 10/06315* (2013.01); *G06Q 10/083* (2013.01); *G06Q 50/06* (2013.01)

(56) References Cited

U.S. PATENT DOCUMENTS

| | | |
|---|---|---|
| 2015/0324740 A1 | 11/2015 | Shao et al. |
| 2016/0343092 A1 | 11/2016 | Legrand et al. |
| 2017/0213302 A1 | 7/2017 | Saito et al. |
| 2023/0078287 A1* | 3/2023 | Nam ..................... G06Q 10/04 705/7.31 |

OTHER PUBLICATIONS

International Search Report of PCT/JP2021/030647 dated Nov. 22, 2021.
Taiwanese Office Action dated Oct. 19, 2022 corresponding to Taiwanese Application No. 110133970.
Extended European Search Report received in corresponding European Application No. 21891447.1 dated Aug. 27, 2024.
Brouer, Berit Dangaard et al: "Optimization in liner shipping", Springer Berlin Heidelberg 2017, Mar. 3, 2017, pp. 1-35, vol. 15, No. 1, Berlin/Heidelberg, Germany.

* cited by examiner

POWER GENERATION PLANNING DEVICE AND POWER GENERATION PLANNING METHOD

TECHNICAL FIELD

The present invention relates to a power generation planning device and a power generation planning method used by an electricity supplier such as an operator that owns a plurality of power generation facilities and an electricity broker to generate a power generation plan and a fuel utilization plan.

BACKGROUND ART

A conventional power generation plan of a generator determines the generator's start and stop states and output that are adjusted according to the power demand while satisfying operational constraints of each generator and power system on the basis of the demand prediction value at each time in a planned period. Non Patent Literature 1 discloses a method of generating such a power generation plan of a generator. As disclosed in Non Patent Literature 1, the power generation plan is created so as to minimize the total power generation cost while satisfying operational constraints of each generator and power system such as a supply-demand balance where the supply and demand of power coincide, the minimum-up time and minimum-down time where a started or stopped generator maintains that state for a certain time period, and a fuel consumption amount where fuel of a designated amount range is consumed in a specific period.

Meanwhile, in recent years, renewable energy such as photovoltaic power generation whose output depends on weather is interconnected with power systems on a large scale. An increase in power generation and output of such renewable energy may reduce the generation opportunity of thermal power generators and generate a surplus of fuel of the thermal power generator.

Conventionally, a power generation plan has been created and then a fuel utilization plan for procuring fuel necessary for the power generation plan has been created. However, to avoid surplus fuel, there is a need for economical fuel consumption based on a plan comprehensively taking into account both power generation and fuel utilization. Patent Literature 1 describes such a comprehensive fuel and power generation plan. In Patent Literature 1, a fuel utilization plan of the fuel tank level and the fuel sales transaction amount and the power generation plan described above taking into account the electricity sales amount in the electricity market and the fuel consumption amount caused by power generation are repeatedly generated on the basis of each other's results. As a result, the fuel utilization plan and the power generation plan are improved economically in consideration of each other's effects.

CITATION LIST

Patent Literature

Patent Literature 1: Japanese Patent No. 6513039

Non Patent Literature

Non Patent Literature 1: Toshiyuki Sawa, Yasuo Sato, Mitsuo Tsurugai, and Tsukasa Onishi, "Daily Integrated Generation Scheduling for Thermal, Pumped-Storage Hydro and Cascaded Hydro Units and Purchasing Power Considering Network Constraints", IEEJ Trans. PE, Vol. 128, No. 10 (2008)

SUMMARY OF INVENTION

Technical Problem

Since fuel of the fuel tank is consumed by power generation, the fuel tank level is maintained by refilling fuel by a fuel ship or reducing output of a thermal power generator coupled to the fuel tank. A change in the weather over the ocean or delay in fuel supply to the fuel tank due to a failure in the fuel ship may cause shortage of fuel in the fuel tank. A decrease in power generation opportunity due to an unexpected change in power demand or failure in the generator may lead to insufficient fuel consumption and generate a surplus of fuel.

Meanwhile, to ensure transport of fuel before the scheduled arrival date, a fuel ship arrives near the fuel tank a few days before the scheduled date and stands by off the coast, and therefore requires a standby cost. Additionally, in recent years, the power generating company owns the fuel ship in many cases.

However, Patent Literature 1 does not take into account fuel transport or delay in fuel supply by a fuel ship, elimination of standby cost accompanying anchorage of a fuel ship, or change in fuel consumption due to an unexpected power demand, and therefore a condition change in fuel transport or demand cannot be dealt with, and also standby cost cannot be eliminated.

In view of the foregoing, the present invention aims to eliminate surplus fuel in a thermal power generator accompanying introduction of renewable energy on a large scale and eliminate standby cost of a fuel ship off the coast of a port, and when there is a condition change in transport or demand, economically adjust a fuel utilization plan (ship allocation plan) such as fuel transport and thermal power generator operation to deal with the condition change.

Solution to Problem

In order to solve the above problem, the present invention provides a power generation planning device for taking a countermeasure against a condition change (imbalance) from an assumed state of a power generation plan for a generator and a ship allocation plan for a ship transporting a power generation fuel of the generator, the power generation planning device including: an adjustment range calculation unit that calculates an adjustable range and an adjustment cost of generator operation based on the power generation plan and an adjustable range and an adjustment cost of fuel utilization based on the ship allocation plan, and an imbalance countermeasure amount calculation unit that generates a plan of or calculates an adjustment amount of the generator operation and the fuel utilization that optimize a certain index within the adjustable range of the generator operation and the fuel utilization under constraints regarding the power generation plan and the ship allocation plan.

Advantageous Effects of Invention

According to the effects of the present invention, when a condition change of fuel transport or fuel consumption occurs, by adjusting the supply time to a fuel tank by destination adjustment or speed adjustment of a fuel ship, or adjusting the fuel consumption amount by adjusting output and start/stop of a thermal generator, it is possible to deal with the condition change of transport and demand, and eliminate the standby cost of the fuel ship to improve economic efficiency. Objects, configuration, and effects other than those above will be made clear by the following description of embodiments.

DESCRIPTION OF EMBODIMENTS

Hereinafter, embodiments suitable for carrying out the present invention will be described. Note that the following are merely examples, and are not intended to limit the invention to the specific contents.

Embodiment 1

Embodiment 1 of the present invention will be described below.

Functional Configuration of Power Generation Planning Device 10 of Embodiment 1

Figure 1:
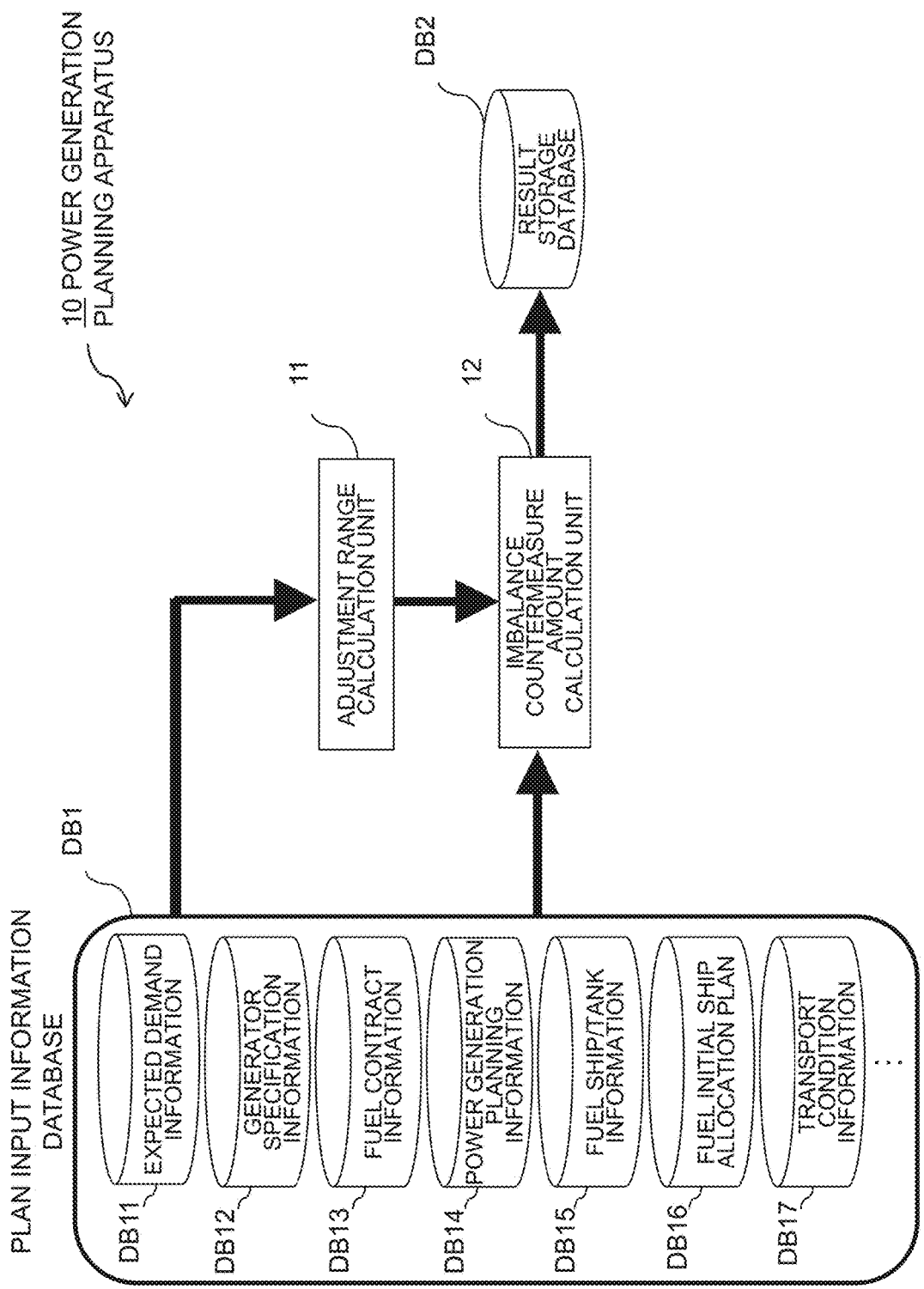
FIG. 1 is a diagram illustrating a functional configuration example of a power generation planning device of Embodiment 1.

FIG. 1 is a diagram illustrating a functional configuration example of a power generation planning device 10 of Embodiment 1. The power generation planning device 10 includes a plan input information database DB1, an adjustment range calculation unit 11, an imbalance countermeasure amount calculation unit 12, and a result storage database DB2.

The plan input information database DB1 is an example of a plan information input unit, and stores an expected demand information DB11, a generator specification information DB12, a fuel contract information DB13, a power generation planning information DB14, a fuel ship/tank information DB15, a fuel initial ship allocation plan DB16, a transport condition information DB17, and other information.

The expected demand information DB11 indicates the expected demand of power, and is information corresponding to the necessary power generation amount. The generator specification information DB12 is information including a machine specification constant indicating characteristics of each generator and the like. The fuel contract information DB13 is information related to a contract regarding fuel signed by a power generation operator and another party. The fuel ship/tank information DB15 is information indicating the specification and current state of a fuel ship, a fuel tank, and the like owned by a power generation operator or a fuel supplier. The transport condition information DB17 is information related to transport such as the meteorological condition of the course of a fuel ship and transport delay. These and other types of information are information necessary for generating a fuel utilization plan and a power generation plan.

When there is a change in the condition of the expected demand information DB11 or the fuel ship arrival information of the transport condition information DB17 in the plan input information database DB1, the adjustment range calculation unit 11 calculates the operation adjustment range of a fuel ship and an operation adjustment range of a thermal power generator that are planning targets and are adjustable and the costs thereof to deal with the condition change at the corresponding time. For example, the adjustment range calculation unit 11 calculates an adjustable range for dealing with the condition change and the cost thereof, such as, with respect to a fuel ship that can arrive near the home country (Japan in present embodiment) around the date whose information change has been estimated, the range of arrival time that can be reached by changing the destination or adjusting the speed and the adjustment cost thereof, or the range of fuel that can be adjusted by output and start/stop adjustment of a thermal power generator.

On the basis of the adjustable range and the cost thereof which is the output of the adjustment range calculation unit 11, the imbalance countermeasure amount calculation unit 12 calculates the adjustment amount for dealing with the condition change in which an imbalance has occurred, and stores the calculated result in the result storage database DB2 and displays the calculated result on a screen. The adjustment amount for dealing with the condition change is a change in arrival time of a fuel ship by a destination change or speed adjustment or output adjustment or start/stop adjustment of a generator, for example, that minimizes the adjustment cost within the adjustable range.

Hardware Configuration of Power Generation Planning Device 10 of Embodiment 1

Figure 2:
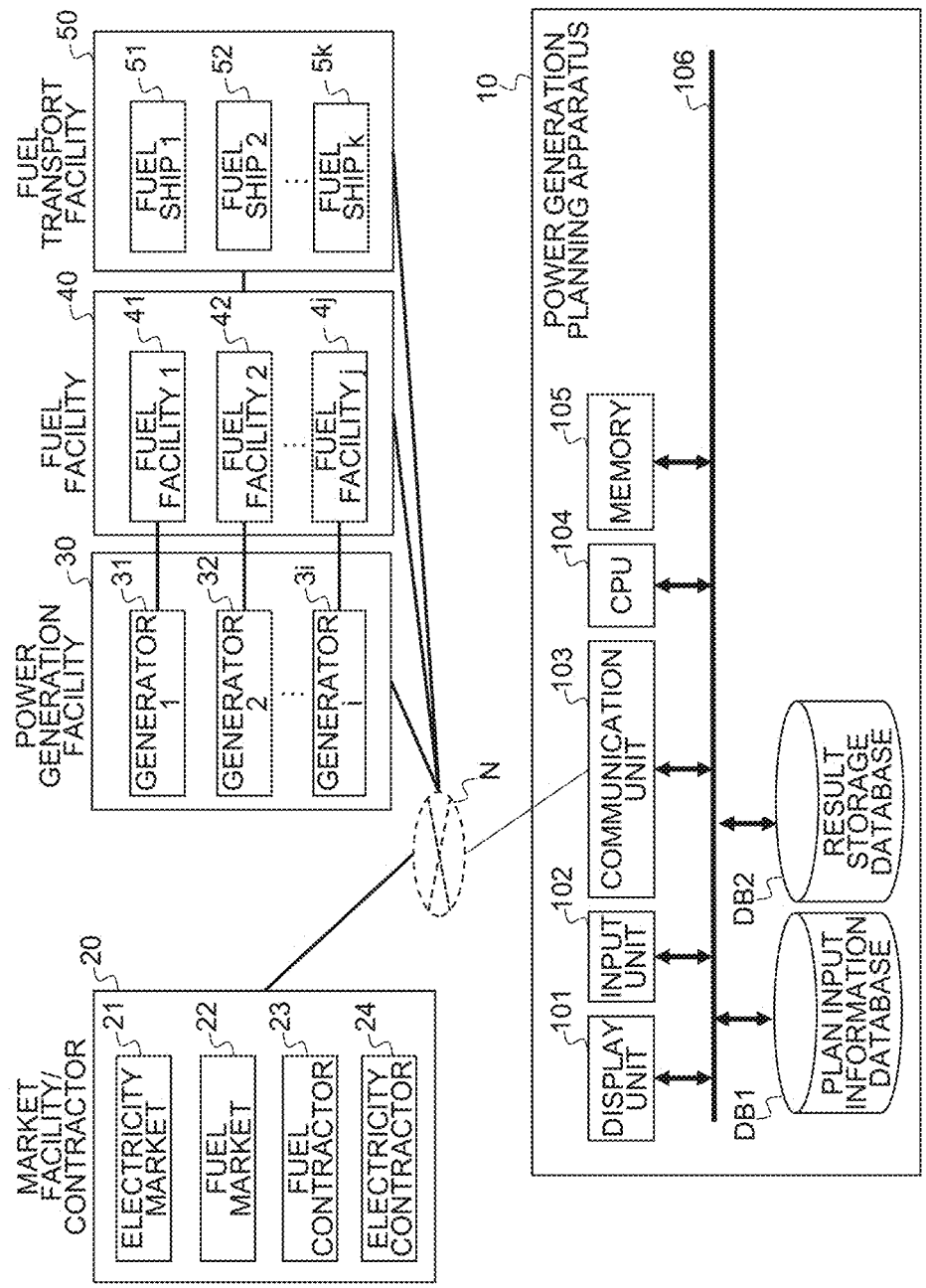
FIG. 2 is a diagram illustrating a hardware configuration example of the power generation planning device of Embodiment 1.

FIG. 2 is a diagram illustrating a hardware configuration example of the power generation planning device 10 of Embodiment 1. The power generation planning device 10 is connected with a power generation facility 30, a fuel facility 40, a fuel transport facility 50, and a market facility/contractor 20 via a communication network N. The power generation facility 30 includes generators 31, 32, . . . , 3i such as a thermal power generator. The fuel facility 40 includes fuel facilities 41, 42, . . . , 4j such as a fuel tank that stores and supplies fuel of the generators. The fuel transport facility 50 includes fuel ships 51, 52, . . . , 5k that transport fuel from fuel supply locations to the fuel facilities 40.

The market facility/contractor 20 is a management device that manages devices of an electricity market 21, a fuel market 22, and a fuel contractor 23 and an electricity contractor 24 who are negotiated-contract partners.

The power generation planning device 10 acquires information of the power generation facility 30, the fuel facility 40, the fuel transport facility 50, and the market facility/ contractor 20 by communication via the communication network N by a communication unit 103, and stores the information in the plan input information database DB1. Additionally, the power generation planning device 10 reads calculation results such as the adjustment amount from the result storage database DB2 and gives instruction to the power generation facility 30, the fuel facility 40, the fuel transport facility 50, and the market facility/contractor 20. Note that in a case where there are other pieces of input information necessary for the power generation planning device 10, the communication unit 103 acquires the input information by communicating with other systems as well.

The power generation planning device 10 is formed of a computer system, and includes a display unit 101 such as a display device, an input unit 102 such as a keyboard and a mouse, the communication unit 103, a CPU 104, a memory 105, the plan input information database DB1, and the result storage database DB2 coupled to one another via a bus 106.

Among the components, for example, the display unit 101 may be configured to use a printer device, a voice output device, or the like instead of or in addition to the display device. For example, the input unit 102 may be configured to include at least one of a pointing device such as a keyboard switch or a mouse, a touch panel, voice instruction device, and the like. The communication unit 103 includes a circuit and a communication protocol for connecting to the communication network N. The CPU 104 executes a calculation program to instruct an image data to be displayed and search data in various databases, for example.

The CPU 104 may be formed as one or a plurality of semiconductor chips, or may be formed as a computer device such as a calculation server. The memory 105 is formed as a random access memory (RAM), for example, and store a computer program or stores calculation result data, image data, and the like necessary for each processing, for example. Data stored in the memory 105 is transmitted to the display unit 101 to be displayed.

Overall Processing of Power Generation Planning Device 10 of Embodiment 1

Figure 3:
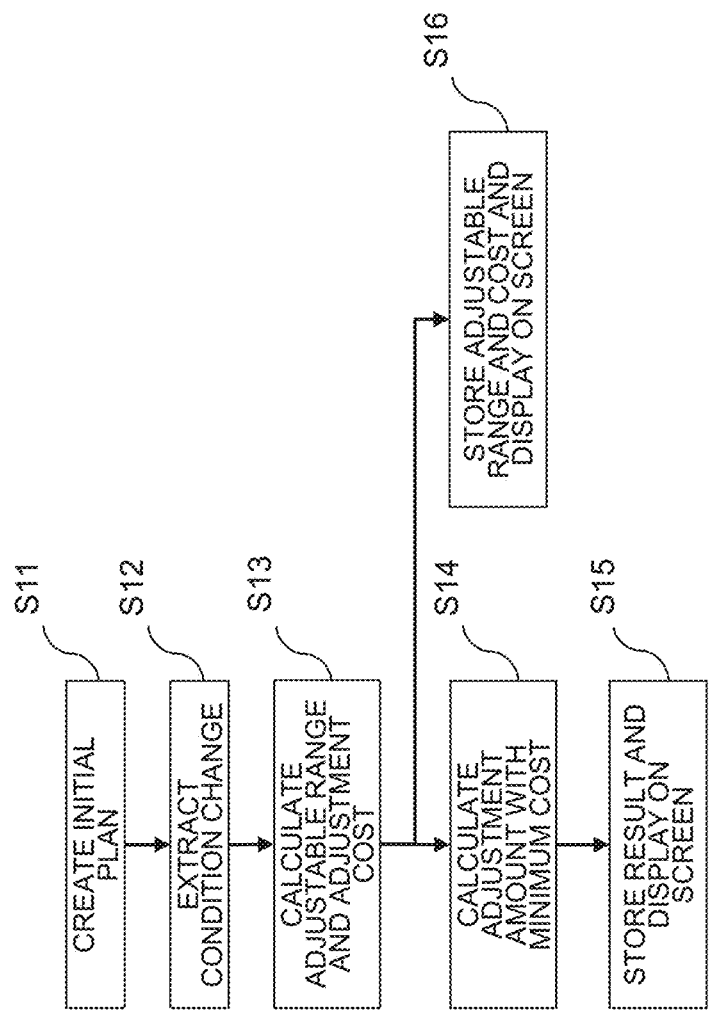
FIG. 3 is a flowchart illustrating an example of overall processing of the power generation planning device of Embodiment 1.

FIG. 3 is a flowchart illustrating an example of the overall processing of the power generation planning device 10 of Embodiment 1.

First, in S11, as an advance preparation, the power generation planning device 10 generates, as an initial plan, for example, a ship allocation plan for fuel utilization indicating an arrival location, an arrival time, and fuel to be transported of a fuel ship, and a power generation plan indicating the start time and stop time and power generation amount of each generator and the transition of the fuel tank level for generating power equivalent to the power demand.

Note that instead of the information generated as an advance preparation, the power generation planning information DB14 or the fuel initial ship allocation plan DB16 generated in advance and stored in the plan input information database DB1 may be used, or if necessary information is not in the plan input information database DB1, information can be generated on the basis of the following Document 1 and Document 2.

Document 1: Toshiyuki Sawa, Yasuo Sato, Mitsuo Tsurugai, and Tsukasa Onishi, "Daily Integrated Generation Scheduling for Thermal, Pumped-Storage Hydro and Cascaded Hydro Units and Purchasing Power Considering Network Constraints", IEEJ Trans. PE, Vol. 128, No. 10 (2008)

Document 2: Takahiro Seta, "Ship scheduling Optimization Using Mathematical Programming Techniques for Coastal Shipping with Maximal Fleet Size in Japan", Journal of the Japan Society of Naval Architects and Ocean Engineers, Vol. 11, pp 157-164, 2010

Next, in S12, the power generation planning device 10 updates the information of the plan input information database DB1 and calculates whether there has been a condition change in the expected demand and the arrival time of the fuel ship.

Next, in S13, if there has been a condition change in S12, the adjustment range calculation unit 11 needs to adjust the ship allocation plan in the fuel utilization plan and the power generation plan to deal with the change, and therefore calculates the adjustable range of the ship allocation plan and the power generation plan. The adjustable range of each of the ship allocation plan and the power generation plan will be described below.

(Adjustable Range of Ship Allocation Plan)

Figure 4:
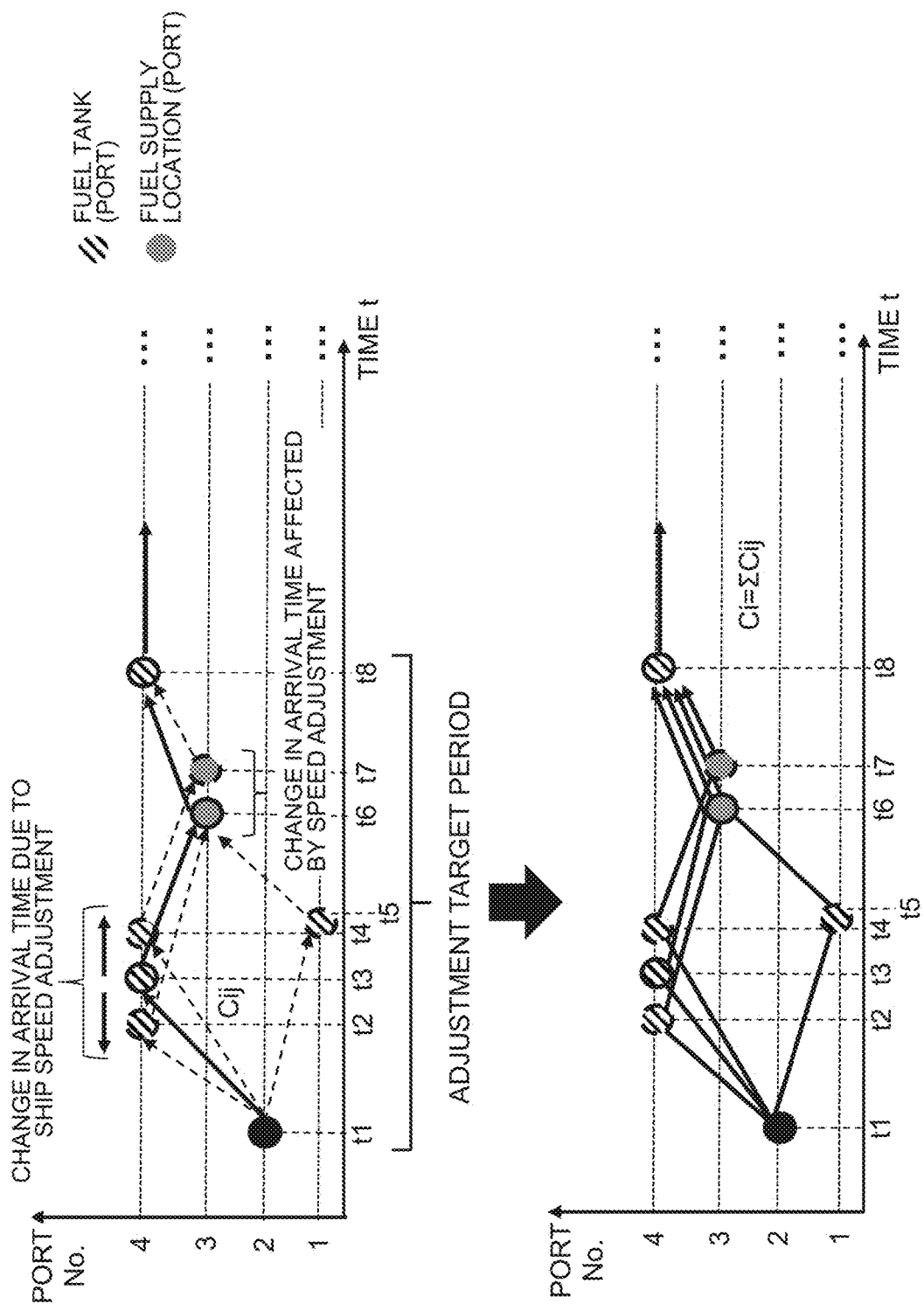
FIG. 4 is a diagram for describing an example of fuel ship course candidate generation processing in an adjustment range calculation unit of Embodiment 1.

FIG. 4 is a diagram for describing an example of fuel ship course candidate generation processing in the adjustment range calculation unit 11 of Embodiment 1. In FIG. 4, in the upper and lower diagrams, the vertical axis represents ports (four ports of No. 1 to No. 4) where the fuel ship stops, and the horizontal axis represents time. Additionally, in FIG. 4, a hatched circular symbol represents a fuel tank at a port to which fuel is carried in from the fuel ship, and a grey circular symbol represents a fuel supply location (port) where fuel is loaded onto the fuel ship. Additionally, in FIG. 4, a black circle represents a port where the fuel ship is currently located (current location). In FIG. 4, of the outer periphery and arrows of the hatched and grey circular symbols, those in a solid line represent the arrival port, arrival time, and travel route of the fuel ship in an initial plan, and those in a broken line represent the arrival port, arrival time, and travel route as a result of destination adjustment or speed adjustment. $C_{ij}$ is the cost of travel from the currently located port of the fuel ship to the next arrival destination at a certain time, and includes the cost of destination adjustment and speed adjustment.

As illustrated in the upper diagram of FIG. 4, in the ship allocation plan, by adjusting the arrival time of each fuel ship by speed adjustment and changing the arriving destination from the scheduled port to another port, it is possible to adjust the course of the ship from a time (time t1) at the current location to an adjustment end time (time t8) and the arrival time. In the upper diagram of FIG. 4, the fuel ship was scheduled to arrive at Port 4 at time t3 in the initial ship allocation plan, but the arrival time at Port 4 changes to time t2 or t4 by speed adjustment.

Additionally, as illustrated in the upper diagram of FIG. 4, the fuel ship was scheduled to arrive at Port 4 at time t3 in the initial ship allocation plan, but the course is changed to arriving at Port 1 at time t5 by destination adjustment. Additionally, as illustrated in the upper diagram of FIG. 4, the fuel ship was scheduled to arrive at Port 3 at time t6 in the initial ship allocation plan, but due to the influence of speed adjustment during travel from the current location (Port 2) to Port 4, when leaving Port 4 at time t4 and moving to Port 3, the course is changed to arriving at Port 3 at time t7. Assume that the course after Port 4 at time t8 is as scheduled in the initial ship allocation plan.

The adjustment range calculation unit 11 combines all destination changes and speed adjustments suggested in the upper diagram of FIG. 4, and generates a plurality of course candidates of time t1 to time t8 having a different port arrival time or arrival port as in the lower diagram of FIG. 4. The cost of a course candidate i is $C_i = \Sigma C_{ij}$. The adjustment range calculation unit 11 generates these course candidates as an adjustable range. Note that the cost accompanying the travel differs among the course candidates i depending on the speed adjustment and destination change, and therefore the cost $C_i = \tau C_{ij}$ required for fuel transport such as the travel cost is calculated for each candidate. Since a round trip of a fuel ship to a fuel supply country from Japan takes roughly two weeks, the period from time t1 at the current location to the adjustment end time t8 is assumed to be about a month, for example.

(Adjustable Range of Power Generation Plan)

Of the power generation plans in the plan input information database DB1 generated in advance, a power generation plan is excluded from the adjustable range when a regulation for supply-demand operation of the power system and operation determined by the operator's needs. The start/stop and output of the generator at all times except for the above are set as the adjustable range of the power generation plan. Note that since the range to be adjusted in the ship allocation plan is about one month or more, the calculation time may become an issue. In such a case, the calculation time can be shortened by limiting the adjustment range, such as setting the start/stop state of the generator that does not affect fuel utilization such as ship allocation to the same state as that at the time of planning of the advance preparation.

In S14, the imbalance countermeasure amount calculation unit 12 adjusts the power generation plan and the ship allocation plan on the basis of the adjustable range of the power generation plan created in S11 and the ship allocation plan created in S13. For this adjustment, the power generation plan and the ship allocation plan are regarded as an optimization problem to construct the following mathematical models, and the objective function is minimized to minimize the total power generation cost and ship allocation adjustment cost. By solving this optimization problem, one candidate course for each fuel ship is selected from among the plurality of course candidates generated by combining the speed adjustment and destination change of the fuel ship within the range satisfying the operational constraints of power generation operation and fuel utilization such as the fuel tank level. Speed adjustment, destination change, and the like are determined from the selected course candidate.

Additionally, an adjustment result of the output and start/stop of each generator within a range satisfying the operational constraints of power generation operation and fuel utilization can also be obtained. When solving these optimization problems, since Formula (1) is an optimization problem called a mixed-integer quadratic programming problem, optimization can be performed by applying a commercial optimization solver.

Objective Function of Embodiment 1

As shown in Formula (1), the objective function of Embodiment 1 is a function for minimizing the sum of the total power generation cost of all generators within the planned time period and the ship allocation adjustment cost.

[Math 1]

$$\min_{P_{it}, u_{it}, X_{vr}} \left[ \underbrace{\sum_{t=1}^{T_{end}} \left( \sum_{i=1}^{N_{gen}} \{a_i P_{it}^2 + b_i P_{it} + C_i u_{it} + SUC_i(\Delta u_{it})\} \right)}_{\text{Total power generation cost of power generation plan}} + \underbrace{\sum_{v,r} C_{vr} X_{vr}}_{\substack{\text{Cost of selected course candidate} \\ \text{(ship allocation adjustment cost)}}} \right] \quad (1)$$

Note that the definitions of symbols in Formula (1) are as follows.

$T_{end}$: Plan end time, $N_{gen}$: number of generators, $a_i$, $b_i$, $c_i$: power generation cost coefficient, $P_{it}$: power generation output, $u_{it}$: discrete variable of 0 or 1 indicating start or stop, $\Delta u_{it}$: 1 (initial time point of start), 0 (other), $SUC_i$: starting cost, $X_{vr} \in \{0,1\}$: selection of course candidate ($X_{vr}=0$: not selected, $X_{vr}=1$: selected), v: ship number, r: course candidate number, t: time, j: port number, $C_{vr}$: ship allocation adjustment cost of each course candidate Constraints Regarding Power Generation Plan of Embodiment 1

Constraints regarding the power generation plan of Embodiment 1 are as follows.
- Maximum and minimum generator output (output of each generator is within range between maximum output and minimum output)
- Supply-demand balance (shared demand coincides with total power generation output)
- Minimum continuous start/stop time period (restart or re-stopping is after minimum-up/down time)
- Operation and stop period (stop or continue operation of generator in designated period)
- Operating reserve, necessary adjustment power (reserve capacity for compensating for error between actual operation and power generation plan)
- Total fuel consumption amount (total fuel consumption amount in specific period is within range)

Constraints Regarding Ship Allocation Plan of Embodiment 1

Constraints regarding the ship allocation plan of Embodiment 1 are as follows.
- As shown in Formula (2), the fuel tank level is within the maximum and minimum capacity or less (defined for each fuel tank at each time point).

[Math 2]

$$V_{min\ j} < V_{init\ j} + \underbrace{\sum_{m=1}^{t} \sum_{v,r} Q_{jmvr} X_{vr}}_{\substack{\text{Selected course candidate} \\ \text{Fuel supply to port } j}} + \underbrace{\sum_{m=1}^{t} (f_i P_{it} + f_{const\ i} u_{it})}_{\text{Fuel consumption by genrator}} < V_{max\ j} \quad (2)$$

$$\underbrace{\phantom{V_{init\ j} + \sum \sum Q X + \sum (fP + fu)}}_{\text{Tank level}}$$

Select one course candidate for each ship.

[Math 3]

$$\sum_r X_{vr} = 1 \quad (3)$$

Note that the definitions of symbols in Formulae (2) to (3) are as follows.

$Q_{jtvr}$: Amount of fuel (0 or capacity of ship) supplied to port j by ship v at time point t in course candidate r $\Sigma_{v, r}$: Sum based on number of ships, and sum based on course candidate of ship $f_i P_{it} + f_{const, i} u_{it}$: Fuel consumption amount corresponding to output of generator coupled to fuel tank In S15, the power generation planning device 10 stores the speed adjustment and destination change of the fuel ship and the start/stop and output adjustment amount of each generator obtained by solving the optimization problem in S14 in the result storage database DB2 and displays them on the screen. Additionally, in S16, the power generation planning device 10 stores the adjustable range and adjustment cost of the ship allocation plan and power generation plan created in S13 in the result storage database DB2 and displays them on the screen. Note that when displaying on the screen, the adjustment result may be compared with the initial plan in advance preparation of S11 and the difference may be displayed.

Effects of Embodiment 1

In the present embodiment, course candidates combining speed adjustment and destination change of the fuel ship are set as the adjustable range of the ship allocation plan, and the modifiable range of the advance preparation is set as the adjustable range of the power generation plan. By simultaneously optimizing generator operation and fuel ship operation on the basis of these adjustable ranges, it is possible to calculate speed adjustment and destination change of the fuel ship and start/stop and output of the generator that can minimize the cost of both generator operation and fuel ship operation while satisfying operational constraints of both operations. Here, by considering the speed adjustment and destination change of the fuel ship by course candidates, the course of the fuel ship that requires complex simulation of formulae is simulated by simple and a small number of variables (whether or not each candidate is selected $X_{vr}$), and the calculation time can be reduced.

The current ship allocation operation requires an offshore standby cost to keep the scheduled arrival time. However, even if the time period required for travel changes, it is possible to deal with the situation by using Embodiment 1 to perform speed adjustment and destination change of the fuel ship and adjust start/stop and output of the generator. As a result, it is possible to eliminate standby earlier than the scheduled arrival time and eliminate the standby cost.

While the above is a case in which the arrival time and expected demand of the fuel ship changes, in a case where a failure occurs in the generator or the fuel ship, for example, the operation can be carried out by excluding the failed ship or generator during the failure period. As a result, even when a failure occurs, operational constraints are adhered to by arrival time adjustment by speed adjustment and destination change of other fuel ships and adjustment of output and start/stop of other generators. By making use of this method, a plurality of cases of condition changes such as various assumed failures and arrival time changes can be prepared, the aforementioned S12 to S14 can be executed corresponding to each case, and the calculation result such as the adjustment amount can be stored in the database DB2. With this configuration, when a condition change occurs, the calculation result can be displayed on the screen, and the corresponding adjustment can be executed by the operator or the power generation planning device 10, so that the failure can be dealt with immediately.

That is, in the present embodiment, a power generation and ship operation plan comprehensively taking into account the start/stop operation plan of a thermal power generator based on the power demand and fuel ship operation and minimizing the operational cost is generated. Specifically, a standby cost in which a fuel ship transports fuel and a fuel tank arrives early at a port and stands by is reduced. Since an optimal candidate is selected from among course candidates generated from speed adjustments and destination changes of the fuel ship, a power generation and ship operation plan can be generated with a realistic calculation cost.

Embodiment 2

Embodiment 2 of the present invention will be described below. Note that descriptions overlapping the contents described in Embodiment 1 are omitted.

Functional Configuration of Power Generation Planning Device 10B of Embodiment 2

Figure 5:
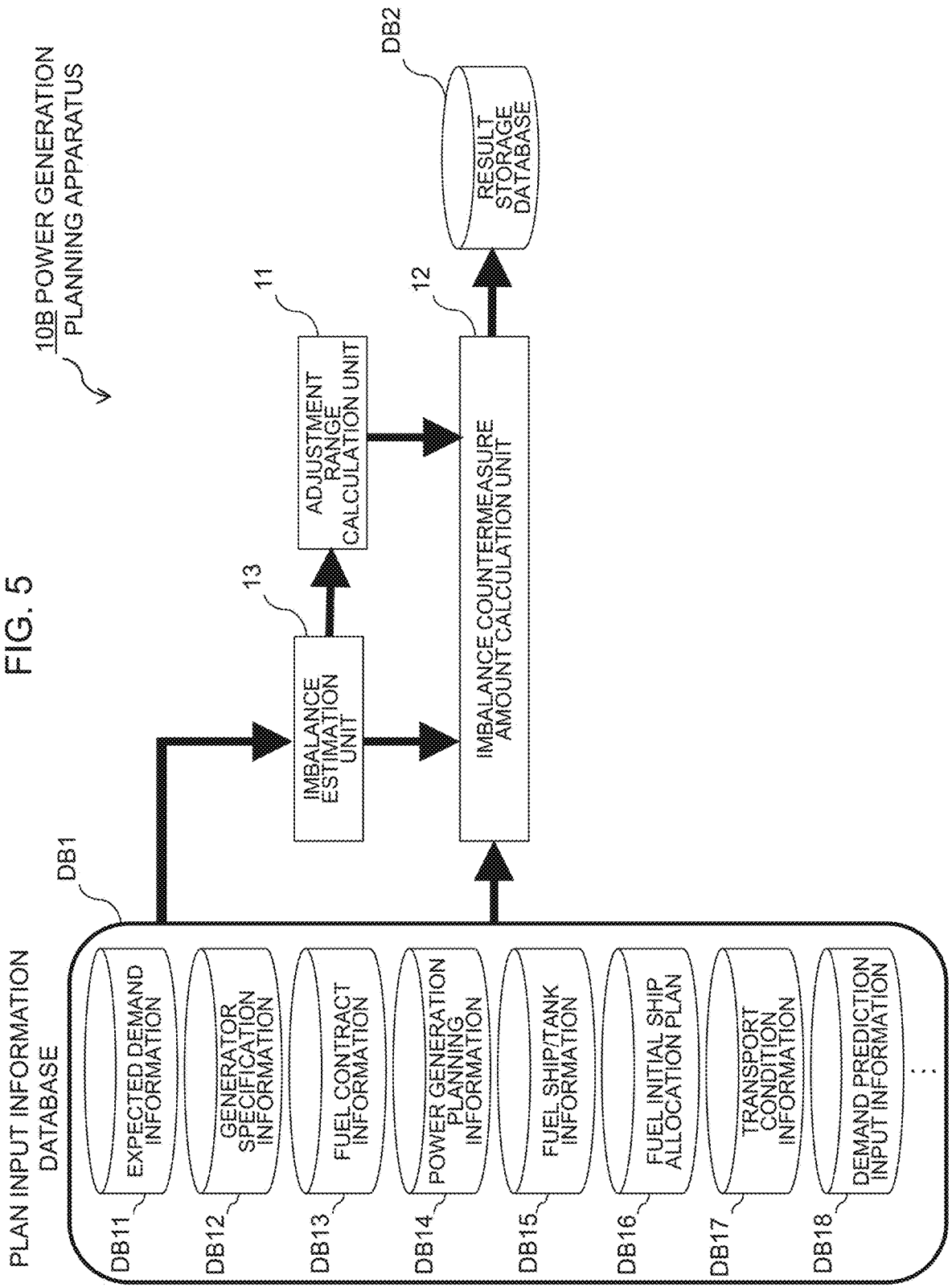
FIG. 5 is a diagram illustrating a functional configuration example of a power generation planning device of Embodiment 2.

FIG. 5 is a diagram illustrating a functional configuration example of a power generation planning device 10B of Embodiment 2. The power generation planning device 10B is different from the power generation planning device 10 of Embodiment 1 in that it includes an imbalance estimation unit 13. The hardware configuration of the power generation planning device 10B is similar to the power generation planning device 10.

The imbalance estimation unit 13 receives, as an input, demand prediction input information DB18 which is information necessary for demand prediction like the meteorological condition and transport condition information DB17 such as the weather of a transport path that has an effect on fuel transport such as delay in the plan input information database DB1, and predicts and outputs a condition change width of the delay of fuel ship transport, power demand, or the like.

As in Embodiment 1, the adjustment range calculation unit 11 calculates an adjustable range for dealing with the condition change and the cost thereof, such as, with respect to a fuel ship that can arrive near the home country (Japan in present embodiment) around the date when the condition change occurs, the range of arrival time that can be reached by changing the destination or adjusting the speed and the adjustment cost thereof, or the range of fuel that can be adjusted by output and start/stop adjustment of a thermal power generator.

The imbalance countermeasure amount calculation unit 12 receives, as an input, a predicted condition change width of the arrival delay of a fuel ship, the power demand, or the like calculated by the imbalance estimation unit 13 and the adjustable range and its cost calculated by the adjustment range calculation unit 11, calculates an adjustment amount for dealing with the condition change, and stores the calculated result in the result storage database DB2 and displays it on the screen. An adjustment amount for dealing with a condition change in a predicted width is a change in arrival time caused by a destination change or speed adjustment of the fuel ship, output and start/stop adjustment of the generator, and the like that prevent violation of operation such as deficiency or excess of the fuel tank level no matter what condition change occurs within the predicted width.

Overall Processing of Power Generation Planning Device 10B of Embodiment 2

Figure 6:
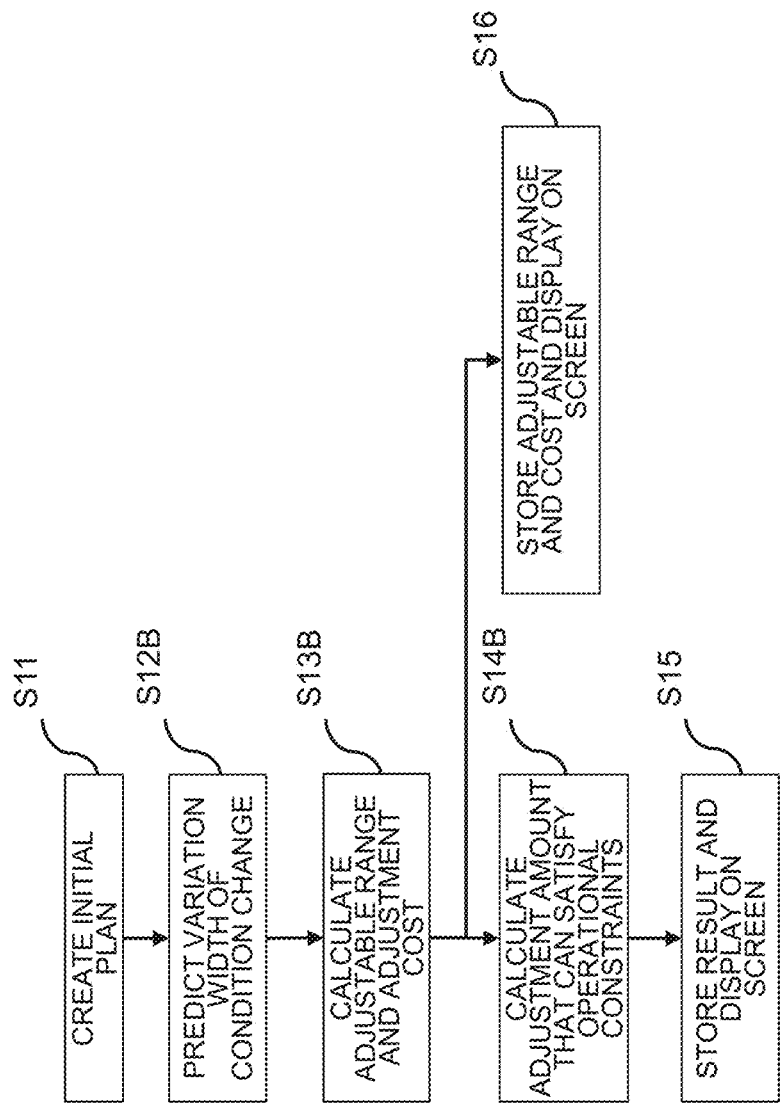
FIG. 6 is a flowchart illustrating an example of overall processing of the power generation planning device of Embodiment 2.

FIG. 6 is a flowchart illustrating an example of the overall processing of the power generation planning device 10B of Embodiment 2. The processing is different from the overall processing of the power generation planning device 10 of Embodiment 1 illustrated in FIG. 3 in that S12B is executed instead of S12, S13B is executed instead of S13, and S14B is executed instead of S14.

In S12B, after the update of information of the plan input information database DB1 in S11, the imbalance estimation unit 13 predicts a possible distribution of the power demand and the travel time period of the fuel ship in the following manner. In these predicted distributions, a width of distribution having a high possibility of including a true value is defined as a credible interval, and is set as a change width of power demand and the width of arrival time of the fuel ship. The imbalance estimation unit 13 outputs the change width of power demand and the width of arrival time of the fuel ship.

The imbalance estimation unit 13 predicts the width of demand change in the following manner. Document 3 is a document describing an example of predicted values and the prediction distribution thereof, that is, the prediction distribution as a possible distribution.

Document 3: C. M. Bishop: "Patan ninshiki to kikai gakushu Jyo beizu riron niyoru toukeitekiyosoku (Pattern recognition and machine learning 1, statistical prediction based on Bayes' theorem)", Maruzen Publishing Co., Ltd., pp 28-31 (2012)

According to Document 3, the relationship of a prediction target t (prediction of total of demand and power generation outside supply-demand plan) with an input x indicated by temperature, cloud volume, weather, barometric pressure, humidity, precipitation, solar irradiation, actual demand, actual photovoltaic power generation, actual prediction error, and the like is approximated using Formula (4) to consider a distribution including prediction errors.

[Math 4]

$$t = y(x, w) + \varepsilon = w_0 + w_1 x + w_2 x^2 + \ldots w_M x^M + \varepsilon = \sum_{j=0}^{M} w_j x^j + \varepsilon \quad (4)$$

Note that $x = (X_1, X_2, \ldots X_N)^T$ and $y = (Y_1, Y_2, \ldots Y_N)^T$ in Formula (4) are vectors having N elements $X_n$, $Y_n$ (n=1, 2, ... 1, N), $\varepsilon$ is a reciprocal of an approximation accuracy $\beta$ of the prediction target distribution, and $w = (w_0, w_1, \ldots w_m)$ is a matrix parameter.

In Formula (4), the log-likelihood function of w and $\beta$ is expressed by Formula (5). By maximizing the log-likelihood function of Formula (5), a matrix parameter $w = w_{ML}$ in which Formula (4) is the best approximation accuracy $\beta$ can be calculated.

[Math 5]

$$\ln p(t \mid x, w, \beta) = -\frac{\beta}{2} \sum_{n=1}^{N} \{y(x_n, w) - t_n\}^2 + \frac{N}{2} \ln \beta - \frac{N}{2} \ln(2\pi) \quad (5)$$

An approximation accuracy $\beta_{ML}$ at this time is expressed by Formula (6).

[Math 6]

$$\frac{1}{\beta_{ML}} = \frac{1}{N} \sum_{n=1}^{N} \{y(x_n, w_{ML}) - t_n\}^2 \quad (6)$$

A prediction formula including Formula (4) into which the above matrix parameter $w_{ML}$ is substituted and a prediction distribution by $\beta_{WL}^{-1}$ is expressed by Formula (7). In Formula (7), Dist indicates a normal distribution, and is a prediction distribution of distribution $\beta^{-1}{}_{ML}$ with an average value of $y(x, w_{ML})$.

[Math 7]

$$p(t \mid x, w_{ML}, \beta_{ML}) = \mathrm{Dist}(t \mid y(x, w_{ML}), \beta_{ML}^{-1}) \quad (7)$$

Note that the relationship between input information and a prediction target may be learned by the prediction model of Formulae (4) to (7) by using past data in advance, and when predicting, the latest input data may be input to the learned prediction model to perform prediction.

Prediction of Delay Width of Arrival Date of Fuel Ship in Embodiment 2

The delay of arrival date of a fuel ship is greatly affected by the hydrographic conditions. As prediction of such hydrographic conditions, various types of data observed around the world are assimilated in major countries to predict numbers on a global scale, and grid point value (GPV) is distributed to general users. The prediction period is up to 192 hours ahead. Japan Weather Association releases Japan's weather forecast for up to three months ahead, and achieves a long-term prediction regarding hydrographic or meteorological phenomena. By using these long-term predictions of hydrographic and meteorological phenomena in each location at each time that have a great impact on the travel time period of a fuel ship as an input, the arrival time from port to port is predicted by the prediction model of Formulae (4) to (7). Incidentally, assume that the relationship between hydrographic and meteorological phenomena data and arrival time is learned by Formulae (4) to (7) in advance by past data to construct a prediction model.

Figure 7:
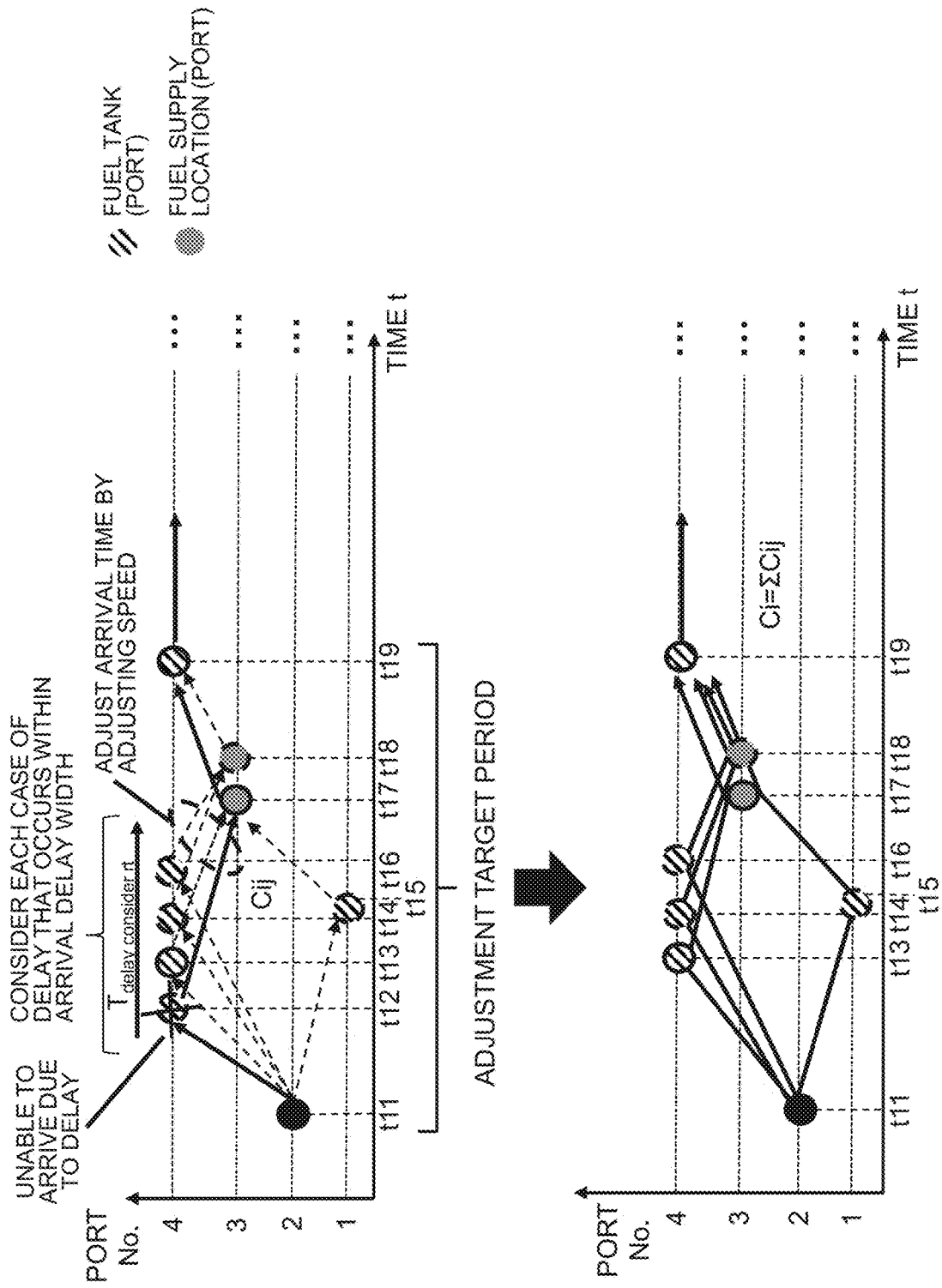
FIG. 7 is a diagram for describing an example of course candidate generation processing taking into account an arrival delay of a ship in Embodiment 2.

As in S13 of Embodiment 1, in S13B, the adjustment range calculation unit 11 calculates the adjustable range of the ship allocation plan and the power generation plan. While the adjustable range of the ship allocation plan is considered by using course candidates as in Embodiment 1, Embodiment 2 also takes into account the influence of an arrival delay as illustrated in FIG. 7. FIG. 7 is a diagram for describing an example of course candidate generation processing taking into account an arrival delay of a ship in Embodiment 2.

When the forecast of hydrographic and meteorological phenomena predicts occurrence of a typhoon or the like and it is predicted that travel of the fuel ship will be limited, the possible range of speed adjustment and destination change are limited, and arrival is disabled. FIG. 7 illustrates an example in which speed adjustment for arriving at Port 4 at time t12 is excluded from the possible range of speed adjustment on the basis of the forecast of hydrographic and meteorological phenomena. Note that in FIG. 7, the destination change for arriving at Port 1 at time t15 is not impacted by the forecast of hydrographic and meteorological phenomena and is within the adjustable range.

In addition, in the delay width of the arrival date calculated in S12B, it is assumed that the delay occurs within the range between the minimum delay and the maximum delay, and it is therefore assumed that there is a plurality of cases of delay within the range. In S14B, in a case of selecting a course candidate of a course in which an assumed delay occurs, an evaluation is made to determine, from among the assumed cases within the delay width, the course candidate with an assumed delay having the smallest adverse effect of delay. Then, this candidate is determined to be the course candidate.

In S14B, the imbalance countermeasure amount calculation unit 12 adjusts the power generation plan and the ship allocation plan in consideration of the condition change in arrival time and demand on the basis of the adjustable range of the power generation plan and ship allocation plan created in S13B. For this adjustment, the power generation plan and the ship allocation plan are regarded as an optimization problem to construct the following mathematical models, and the objective function is minimized to minimize the total power generation cost and ship allocation adjustment cost.

Here, assuming that the condition change of the expected demand changes for the width of the demand change calculated in S12B, $d_{min} < dt < d_{max}$ is set as in Formula (9).

Figure 8:
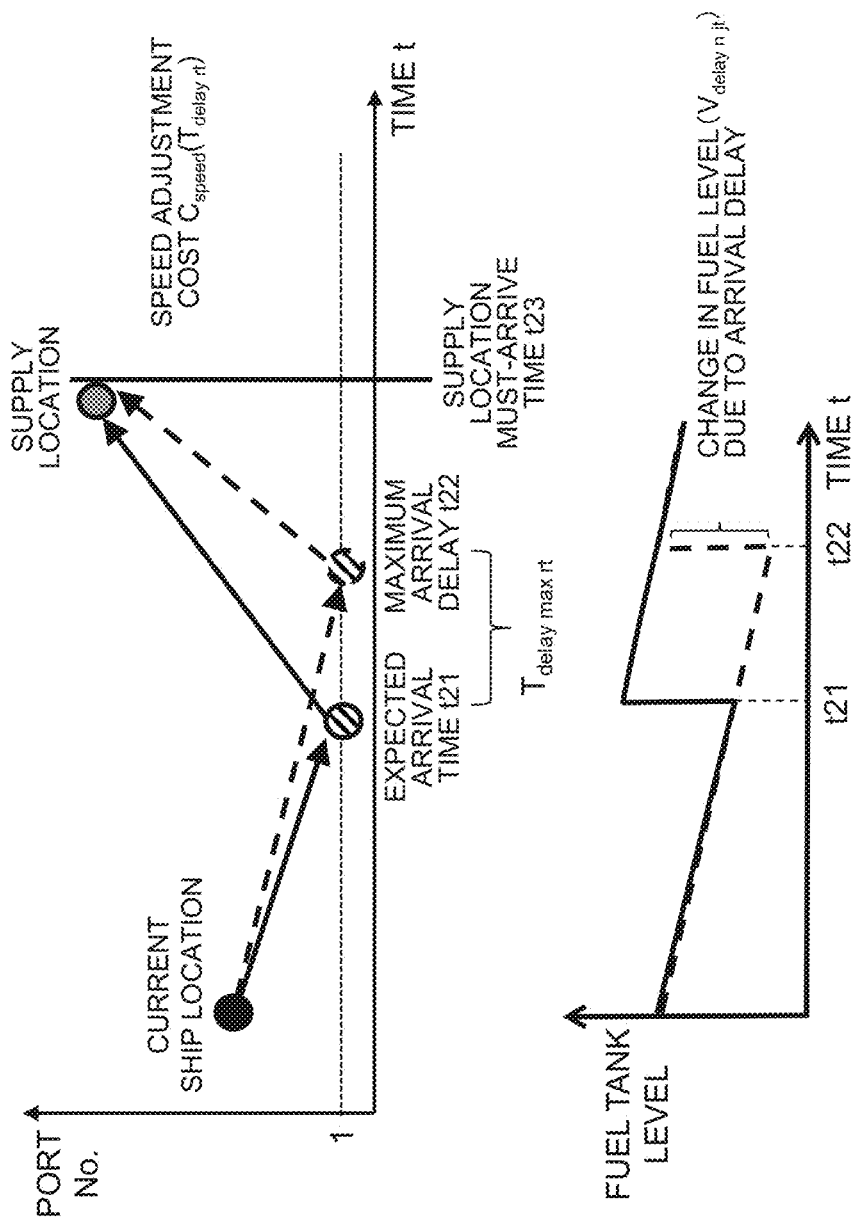
FIG. 8 is a diagram for describing an example of taking into account an arrival delay of a ship by a fuel tank level change in Embodiment 2.

Meanwhile, as illustrated in FIG. 8, the condition change in the arrival time is indicated by a fuel tank level change amount (when delayed: $V_{delay\ it}$, when hastened: $V_{forward\ it}$) attributable to the change width of arrival (when delayed: $T_{delay\ max\ rt}$, when hastened: $T_{forward\ max\ rt}$) calculated in S12B. By taking into account the fuel tank level change amount attributable to the change width of arrival, the fuel tank level is expressed by Formula (11). Here, the fuel tank level change amount attributable to the change width of arrival as in FIG. 8 determines the arrival or non-arrival of the fuel ship in Formula (12), and the fuel consumption amount $V_{delay\ it}$ of the generator in the change width of arrival (when delayed: $T_{delay\ max\ rt}$, when hastened: $T_{forward\ max\ rt}$) is simulated in Formula (13).

Note that when a delay is assumed ($T_{delay\ consider\ rt}$ in FIG. 7) in the course candidate of S13B, since the delay is already considered, it is excluded (t+$T_{delay\ max\ rt}$−$T_{delay\ consider\ rt}$) from the Formula (13) of the fuel tank level change $V_{delay\ rt\ jt}$ attributable to the change width of arrival calculated in S12B. Based on the fuel tank level change attributable to the change width of arrival, the maximum and minimum capacity of the fuel tank are considered in Formula (11).

As illustrated in FIG. 8, another impact of an arrival delay is to deal with the impact of delay by speed adjustment because the next supply location needs to be reached on the arrival time after arriving late at the fuel tank. This speed adjustment cost is $C_{speed}(T_{delay\ rt})$. As for adjustment of a delay not assumed in S13B, its speed adjustment cost is included in the objective function (plan evaluation) of Formula (8).

To evaluate the worst case (max) of the impact (cost of objective function) of arrival change on the fuel tank level change and demand change (dt, $V_{delay\ it}$, $V_{forward\ it}$, $T_{delay\ rt}$), in the objective function of Formula (8), max elements regarding dt, $V_{delay\ it}$, $V_{forward\ it}$, $T_{delay\ rt}$ are assigned. By solving the optimization problem, one candidate for each fuel ship and the output and start/stop state of the generator that prevent deviation from operation even when a condition change occurs are extracted. Speed adjustment, destination change, and the like are also determined by the extracted course candidate.

Note that in Document 4, a demand change is assumed when solving the optimization problem. The calculation can be performed by using Benders decomposition and a commercial optimization solver as in Document 4.

Document 4: Youngchae Cho et al., "Box-Based Temporal Decomposition of Multi-Period Economic Dispatch for Two-Stage Robust Unit Commitment", IEEE Transaction on Power Systems, Vol. 34, No. 4 (2019)

Objective Function of Embodiment 2

As shown in Formula (8), the objective function of Embodiment 1 is a function for minimizing the sum of the total power generation cost of all generators within the planned time period, the ship allocation adjustment cost, the speed adjustment cost at the time of delay, and the deficiency or excess of the tank, and estimating the most conservative (worst) fuel tank level change and speed adjustment cost caused by the change in arrival time due to a demand change or hydrographic phenomena.

[Math 8]

$$\max_{\substack{d_t \\ V_{delay\ jt} \\ V_{forward\ jt} \\ T_{delay\ rt}}} \left\{ \min_{P_{it}, u_{it}, X_{vr}} \underbrace{\sum_{t=1}^{T_{end}} \left( \left( \sum_{i=1}^{N_{gen}} \{a_i P_{it}^2 + b_i P_{it} + C_i u_{it} + SUC_i(\Delta u_{it})\} \right) \right.}_{\text{Total power generation cost of power generation plan}} \right.$$

$$\left. + \underbrace{\sum_{v,r} C_{vr} X_{vr}}_{\substack{\text{Ship allocation} \\ \text{adjustment cost of} \\ \text{selected course}}} + \underbrace{C_{speed}(T_{delay\ rt})}_{\substack{\text{Speed} \\ \text{adjustment} \\ \text{cost at time} \\ \text{of delay}}} + \underbrace{PNLV_{slk}^2}_{\substack{\text{Tank} \\ \text{deficiency} \\ \text{or excess} \\ \text{cost}}} \right\} \right\} \quad (8)$$

Note that the definitions of symbols in Formula (8) are as follows.

$T_{end}$: Plan end time, $N_{gen}$: number of generators, $a_i$, $b_i$, $c_i$: power generation cost coefficient, $P_{it}$: power generation output, $u_{it}$: discrete variable of 0 or 1 indicating start or stop, $\Delta u_{it}$: 1 (initial time point of start), 0 (other), $SUC_i$: starting cost, $X_{vr} \in \{0,1\}$: selection of course candidate ($X_{vr}=0$: not selected, $X_{vr}=1$: selected), v: ship number, r: course candidate number, t: time, j: port number, $C_{vr}$: ship allocation adjustment cost of each course candidate, dt: demand change, $V_{delay\ it}$: fuel tank level change by arrival delay, $V_{forward\ it}$: fuel tank level change by arrival hastening, $T_{delay\ rt}$: arrival delay time period Constraints Regarding Power Generation Plan of Embodiment 2

Constraints regarding the power generation plan of Embodiment 2 are as follows.
  Maximum and minimum generator output (output of each generator is within range between maximum output and minimum output)
  Supply-demand balance (shared demand coincides with total power generation output)
  Minimum-up/down time (restart or re-stopping is after minimum-up/down time)

Operation and stop period (stop or continue operation of generator in designated period)

Operating reserve, necessary adjustment power (reserve capacity for compensating for error between actual operation and power generation plan)

Total fuel consumption amount (total fuel consumption amount in specific period is within range)

Demand change dt satisfies Formula (9). In Formula (9), the first formula represents the delay width of the supply-demand change dt and the second formula represents the supply-demand balance.

[Math 9]

$$d_{min\,t} < d_t < d_{max\,t} \qquad (9)$$
$$d_t = \sum_i P_{it}$$

Constraints Regarding Ship Allocation Plan of Embodiment 2

Constraints regarding the ship allocation plan of Embodiment 2 are as follows.

The arrival delay width is within a range between the maximum and minimum delay as in Formula (10).

[Math 10]

$$T_{delay\,max\,rt} \geq T_{delay\,rt} + \underbrace{T_{delay\,consider\,rt}}_{\text{Do not consider } T_{delay\,rt} \text{ when delay is already taken into account in course candidate}} \geq T_{delay\,min\,rt} \qquad (10)$$

As shown in Formula (11), the fuel tank level is within the maximum and minimum capacity or less (define for each fuel tank at each time point).

[Math 11]

$$V_{min\,j} <$$
$$V_{init\,j} + \underbrace{\sum_{m=1}^{t-1}\sum_{v,r} Q_{jmvr}X_{vr}}_{\text{Fuel supply by ship allocation adjustment}} + \underbrace{\sum_{m=1}^{t}(f_iP_{im} + f_{const\,i}u_{im})}_{\text{Fuel consumption by generator}} + \underbrace{\sum_{m=1}^{t} V_{slk\,jm} - V_{delay\,jt}}_{\substack{\text{Tank deficiency} \\ \text{or excess}}} \underbrace{\phantom{-V_{delay\,jt}}}_{\substack{\text{Reduced fuel level during} \\ \text{arrival delay period}}}$$

<u>Tank level (when arrival is delayed)</u>

$$V_{init\,j} + \sum_{m=1}^{t}\sum_{v,r} Q_{jmvr}X_{vr} + \sum_{m=1}^{t}(f_iP_{im} + f_{const\,i}u_{im}) + \sum_{m=1}^{t} V_{slk\,jm} + \underbrace{V_{forward\,jt}}_{\substack{\text{Increased fuel level during} \\ \text{arrival hastening period}}} < V_{max\,j}$$

<u>Tank level (when arrival is hastened)</u>

(11)

The fuel tank level change (fuel level reduction) in a case where the fuel ship is scheduled to arrive and will arrive late satisfies Formula (12) and Formula (13).

[Math 12]

$$\underbrace{M_{big}\sum_r A_{jtvr}X_{vr}}_{\substack{\text{Determine whether course candidate is selected in } X_{vr} \text{ and} \\ \text{ship is scheduled to arrive in port } j \text{ at time } t}} \geq V_{delay\,n\,jt} \geq 0 \qquad (12)$$

[Math 13]

$$\underbrace{\sum^{t+T_{delay\,max\,rt}-T_{delay\,consider\,rt}} (f_iP_{im} + f_{const\,i}u_{im})}_{\substack{\text{If scheduled to arrive late, reduce tank level for amount of} \\ \text{fuel consumed by generator according to delayed period.} \\ \text{If delay is already assumed, exclude assumed amount}} \geq V_{delay\,n\,jt} \qquad (13)$$

$$(T_{delay\,consider\,rt})$$

The fuel tank level change (fuel level increase) in a case where the fuel ship is scheduled to arrive and will arrive early is similar to the fuel level reduction change mentioned earlier. Since this is fuel level surplus caused by early arrival before the generator consumes fuel, fuel consumption by the generator before the arrival time is considered. Thus, $V_{forward\,rt}$ is defined and acts on the fuel tank level of Formula (11).

Note that the definitions of symbols of Formulae (8) to (13) are as follows.

$X_{vr} \in \{0,1\}$: Selection of course candidate, v: ship number, r: course candidate number, t: time, j: port number, $C_{vr}$: course travel cost, $Q_{jtvr}$: Amount of fuel (0 or capacity of ship) supplied to port j by ship v at time point t in course candidate r, $V_{csp\,jt}$: fuel consumption at port j at time point t, $\Sigma_{v,r}$: Sum based on number of ships, and sum based on course candidate of ship, $f_iP_{it}+f_{const\,i}u_{it}$: Fuel consumption amount corresponding to output of generator coupled to fuel tank, $T_{delay\,max\,rt}$: Maximum arrival delay at time t in course candidate r, $C_{speed}(T_{delay\,rt})$ Speed adjustment cost for arriving at next supply location before time (cost 0 if it is possible to arrive before arrival time with no speed adjustment), Mbig: big value In S15, the power generation planning device 10B stores the speed adjustment and destination change of the fuel ship and the start/stop and output adjustment amount of each generator obtained by solving the optimization problem in S14B in the result storage database DB2 and displays them on the screen. Additionally, in S16, the power generation planning device 10B stores the change width of arrival time and predicted demand predicted in S12B, the adjustable range of the ship allocation plan and power generation plan, the adjustment cost, and the course candidate calculated in S13B in the result storage database DB2 and displays them on the screen.

Effects of Embodiment 2

A prediction model of demand input information and demand change is generated on the basis of the relationship between past changes in hydrographic conditions and arrival time delay, and the change width of arrival time such as arrival delay and demand change is estimated. In a course where there is a change width in arrival time at the port, the change width in arrival time is taken into account when generating course candidates as an adjustment range, and a course candidate assuming a time change such as a time delay is generated.

Moreover, when generating a plan taking into account both power generation operation and fuel (ship allocation) operation, a worst case of the change in demand and arrival time within the estimated change width is assumed, the case is compared with the assumed delay of a course candidate, and whether there is a fuel tank level excess or an impact on the arrival time at the next arrival location is evaluated as the speed adjustment or tank deficiency or excess cost. At this time, the impact of deviation between the arrival delay assumed in the course candidate and the arrival delay in the worst case is considered by deficiency or excess of the fuel tank level and speed adjustment toward the next supply location.

As a result, it is possible to simultaneously create a ship allocation plan and a power generation plan while considering the impact of arrival time and demand change, and to generate an economical plan having a greater robustness against disturbance (demand change, change in arrival time).

That is, in the present embodiment, when predicting a power demand change and fuel ship delay and reflecting them on the plan, the worst case within the assumed range is used as a base. Hence it is possible to generate a plan having robustness against a power demand change and fuel ship delay.

Other Embodiments

As other embodiments including Embodiments 1 and 2 described above, the following power generation planning device and power generation planning method are disclosed.

(1) A power generation planning device for generating or adjusting a power generation plan of a generator and a ship allocation plan for transporting fuel of the generator, the power generation planning device including: an adjustment range calculation unit that calculates an adjustable range and an adjustment cost of generator operation based on the power generation plan and an adjustable range and an adjustment cost of fuel utilization based on the ship allocation plan; and an imbalance countermeasure amount calculation unit that generates a plan of or calculates an adjustment amount of the generator operation and the fuel utilization that optimize a certain index within the adjustable ranges of the generator operation and the fuel utilization under constraints regarding the power generation plan and the ship allocation plan.

(2) The power generation planning device according to (1) above, in which: the adjustment range calculation unit generates, as the adjustable range of the fuel utilization, a plurality of course candidates of a transport ship of a power generation fuel indicating an arrival location and an arrival time of the transport ship over an adjustment period, and calculates, as the adjustment cost of the fuel utilization, a transport cost of the power generation fuel in a case where each of the course candidates are selected; and the imbalance countermeasure amount calculation unit extracts, from the generator operation and the course candidate, the adjustment amount of the generator operation, the course candidate, and the transport cost that optimize the certain index under constraints regarding the power generation plan and the ship allocation plan including a fuel tank level condition regarding a fuel tank level of the generator.

(3) The power generation planning device according to (1) or (2) above, in which the adjustment range calculation unit generates, as the adjustable range of the fuel utilization, a plurality of course candidates by performing, on a course of a transport ship of a power generation fuel calculated in advance and indicating an arrival location and an arrival time of the transport ship over an adjustment period, speed adjustment of the transport ship to adjust the arrival time and change the arrival location, and calculates, as the adjustment cost of the fuel utilization, a transport cost of the power generation fuel in a case where each of the course candidates are selected.

(4) The power generation planning device according to (2) or (3) above further including an imbalance estimation unit that predicts a change width of power demand from an original power generation plan on the basis of power demand prediction information, or constructs, from past information indicating a prediction value of weather regarding transport of the power generation fuel and delay of the arrival time due to weather, a prediction model by learning a relationship between the weather and the delay, and predicts a change width of the arrival time from an original ship allocation plan on the basis of the prediction model and sequentially updated prediction values of weather, in which the adjustment range calculation unit generates the course candidate on the basis of the change width of power demand or the change width of the arrival time estimated by the imbalance estimation unit to calculate the transport cost.

(5) The power generation planning device according to (4) above, in which: the adjustment range calculation unit generates, as the adjustable range of the fuel utilization, the plurality of course candidates by performing, on a course of the transport ship calculated in advance and indicating an arrival location and an arrival time of the transport ship over an adjustment period, a combination of speed adjustment of the transport ship, change of the arrival location, and adjustment of the arrival time based on the change width of the arrival time in a course whose arrival time is estimated to change by the imbalance estimation unit; and the imbalance countermeasure amount calculation unit evaluates each of the course candidates on the basis of a difference between the arrival time and an arrival time having the maximum delay in the change width of the arrival time, and extracts a course least affected by the delay by the adjustment of the arrival time.

(6) The power generation planning device according to (4) or (5) above, in which, on the basis of the change width of the arrival time estimated by the imbalance estimation unit, in a case where there is a possibility of arriving earlier than the arrival time in an original ship allocation plan, the imbalance countermeasure amount calculation unit corrects a fuel tank level of the generator at the arrival time with a fuel consumption amount of the generator for the amount of time arrived earlier than the arrival time, and in a case where there is a possibility of arriving later than the arrival time in the original ship allocation plan, the imbalance countermeasure amount calculation unit corrects the fuel tank level at the arrival time with a fuel consumption amount of the generator for the amount of time arrived later than the arrival time to evaluate the fuel tank level and evaluate a cost of speed adjustment corresponding to an arrival time at the next arrival location of the transport ship.

(7) The power generation planning device according to any one of (4) to (6) above, in which: the adjustment range calculation unit calculates and stores in advance the adjustable range and the adjustment cost of the generator operation and the adjustable range and the adjustment cost of the fuel utilization for each case of occurrence of an unexpected event; and the imbalance countermeasure amount calculation unit calculates and stores in advance an adjustment amount of the generator operation and the fuel utilization that optimize the certain index within the adjustable range of the generator operation and the fuel utilization of the corresponding case under constraints regarding the power generation plan and the ship allocation plan for each case, and when the unexpected event actually occurs, displays the adjustment amount of the corresponding case on a display unit and adjusts the generator operation and the fuel utilization on the basis of the adjustment amount.

(8) The power generation planning device according to any one of (4) to (7) above, in which at least one of the power demand or the change width of the arrival time estimated by the imbalance estimation unit, the adjustable range and the adjustment cost of the generator operation or the fuel utilization calculated by the adjustment range calculation unit, and the adjustment amount of the generator operation or the fuel utilization calculated by the imbalance countermeasure amount calculation unit is displayed on a display unit.

(9) A power generation planning method executed by a power generation planning device that takes a countermeasure against imbalance between a power generation plan of a generator and a ship allocation plan of the generator, the method including the processes of: an adjustment range calculation unit of the power generation planning device calculating an adjustable range and an adjustment cost of generator operation based on the power generation plan and an adjustable range and an adjustment cost of fuel utilization based on the ship allocation plan, and an imbalance countermeasure amount calculation unit of the power generation planning device calculating an adjustment amount of the generator operation and the fuel utilization that optimize a certain index within the adjustable range of the generator operation and the fuel utilization under constraints regarding the power generation plan and the ship allocation plan.

The embodiments described above have been described in detail for better understanding of the present invention, and do not necessarily include all of the described configurations. Further, in the above embodiments and modification, modification of the device or system configuration, omission, replacement, or combination of some or all of configurations or processing procedures can be performed without departing from the gist of the present invention. Further, the hardware diagrams and block diagrams illustrate only control lines and information lines necessary for description, and do not necessarily illustrate all of the control lines and information lines of the product. It can be considered that in reality, almost all of the components are coupled to each other.

REFERENCE SIGNS LIST 10, 10B: power generation planning device, 11: adjustment range calculation unit, 12: imbalance countermeasure amount calculation unit, 13: imbalance estimation unit, 20: market facility/contractor, 30: power generation facility, 40: fuel facility, 50: fuel transport facility, 101: display unit

The invention claimed is:

1. A power generation planning device for generating or adjusting a power generation plan for a generator and a ship allocation plan for a ship transporting a power generation fuel of the generator, the power generation planning device comprising:
a processor; and
a memory storing instructions that when executed by the processor, configures the processor to:
calculate an adjustable range and an adjustment cost of generator operation based on the power generation plan, and an adjustable range and an adjustment cost of fuel utilization based on the ship allocation plan, and generate, as the adjustable range of the fuel utilization, a plurality of course candidates of a transport ship of a power generation fuel, each course candidate indicating an arrival location, which is different from a current arrival location, and an arrival time of the transport ship, which is different than a current arrival time, over an adjustment period,
calculate, as the adjustment cost of the fuel utilization, a transport cost of the power generation fuel in a case where each of the course candidates are selected, and
generate a plan of or calculate an adjustment amount of the generator operation and the fuel utilization that optimize an index within the adjustable range of the generator operation and the fuel utilization under constraints regarding the power generation plan and the ship allocation plan.

2. The power generation planning device according to claim 1,
wherein the processor is configured to extract, from the generator operation and the course candidate, the adjustment amount of the generator operation, the course candidate, and the transport cost that optimize the index under constraints regarding the power generation plan and the ship allocation plan including a fuel tank level condition regarding a fuel tank level of the generator.

3. The power generation planning device according to claim 2,
wherein the processor is configured to:
predict a change width of power demand from an original power generation plan on the basis of power demand prediction information, or construct, from past information indicating a prediction value of weather regarding transport of the power generation fuel and delay of the arrival time due to weather, a prediction model by learning a relationship between the weather and the delay, and predict a change width of the arrival time from an original ship allocation plan on the basis of the prediction model and sequentially updated prediction values of weather.

4. The power generation planning device according to claim 1,
wherein the processor is configured to generate, as the adjustable range of the fuel utilization, the plurality of course candidates by performing a combination of speed adjustment of the transport ship, change of the arrival location, and adjustment of the arrival time based on the change width of the arrival time in a course whose arrival time is estimated to change, and evaluate each of the course candidates on the basis of a difference between the arrival time and an arrival time having the maximum delay in the change width of the arrival time, and extract a course least affected by the delay by the adjustment of the arrival time.

5. The power generation planning device according to claim 3,
wherein, the processor is configured to:
on the basis of the predicted change width of the arrival time, in a case where there is a possibility of arriving earlier than the arrival time in an original ship allocation plan, correct a fuel tank level of the generator at the arrival time with a fuel consumption amount of the generator for the amount of time arrived earlier than the arrival time, and
where there is a possibility of arriving later than the arrival time in the original ship allocation plan, correct the fuel tank level at the arrival time with a fuel consumption amount of the generator for the amount of time arrived later than the arrival time to evaluate the fuel tank level and evaluate a cost of speed adjustment corresponding to an arrival time at the next arrival location of the transport ship.

6. The power generation planning device according to claim 3,
wherein the processor is configured to:
calculate and store in advance the adjustable range and the adjustment cost of the generator operation and the adjustable range and the adjustment cost of the fuel utilization for each case of occurrence of an unexpected event, and
calculate and store in advance an adjustment amount of the generator operation and the fuel utilization that optimize the index within the adjustable range of the generator operation and the fuel utilization of the corresponding case under constraints regarding the power generation plan and the ship allocation plan for each case, and when the unexpected event actually occurs, display the adjustment amount of the corresponding case on a display unit and adjusts the generator operation and the fuel utilization on the basis of the adjustment amount.

7. The power generation planning device according to claim 3,
wherein at least one of the predicted power demand or the predicted change width of the arrival time, the calculated adjustable range and the calculated adjustment cost of the generator operation or the fuel utilization, and the calculated adjustment amount of the generator operation or the fuel utilization is displayed on a display unit.

8. The power generation planning device according to claim 1,
wherein each course candidate indicates an adjustment to a transport ship speed with respect to an initial transport ship speed in the ship allocation plan.

9. A power generation planning method for generating or adjusting a power generation plan for a generator and a ship allocation plan for a ship transporting a power generation fuel of the generator, the method comprising:
calculating an adjustable range and an adjustment cost of generator operation based on the power generation plan and an adjustable range and an adjustment cost of fuel utilization based on the ship allocation plan, and generating, as the adjustable range of the fuel utilization, a plurality of course candidates of a transport ship of a power generation fuel, each course candidate indicating an arrival location, which is different from a current arrival location, and an arrival time of the transport ship, which is different than a current arrival time, over an adjustment period;
calculating, as the adjustment cost of the fuel utilization, a transport cost of the power generation fuel in a case where each of the course candidates are selected; and
generating a plan of or calculating an adjustment amount of the generator operation and the fuel utilization that optimize an index within the adjustable range of the generator operation and the fuel utilization under constraints regarding the power generation plan and the ship allocation plan.

10. The power generation planning device according to claim 9,
wherein each course candidate indicates an adjustment to a transport ship speed with respect to an initial transport ship speed in the ship allocation plan.

* * * * *